(12) United States Patent
Lindsay et al.

(10) Patent No.: US 12,247,601 B2
(45) Date of Patent: Mar. 11, 2025

(54) ALIGNMENT CAM PIN SYSTEM

(71) Applicants: Austin Lindsay, Santa Rosa, CA (US); William Wallace, Santa Rosa, CA (US)

(72) Inventors: Austin Lindsay, Santa Rosa, CA (US); William Wallace, Santa Rosa, CA (US)

(73) Assignee: West Coast Diesels, Santa Rosa, CA (US)

( * ) Notice: Subject to any disclaimer, the term of this patent is extended or adjusted under 35 U.S.C. 154(b) by 272 days.

(21) Appl. No.: 17/993,347

(22) Filed: Nov. 23, 2022

(65) Prior Publication Data
US 2024/0167494 A1  May 23, 2024

(51) Int. Cl.
 *F16B 39/00* (2006.01)
 *F16B 21/02* (2006.01)

(52) U.S. Cl.
 CPC .................................... *F16B 21/02* (2013.01)

(58) Field of Classification Search
 CPC ............................. F16B 21/02; B60G 2204/44
 USPC .................................................. 411/107, 424
 See application file for complete search history.

(56) References Cited

U.S. PATENT DOCUMENTS

| | | | |
|---|---|---|---|
| 1,996,128 A * | 4/1935 | Thomson | F16B 29/00 411/27 |
| 3,217,772 A * | 11/1965 | Adams | F16B 37/044 411/970 |
| 3,682,508 A * | 8/1972 | Briles | F16B 4/004 411/176 |
| 5,222,758 A * | 6/1993 | Sakai | B62D 21/11 280/124.1 |
| 6,174,117 B1 * | 1/2001 | Kawatani | B23P 11/00 411/107 |
| 7,421,769 B2 * | 9/2008 | Lawrence | B25B 27/02 29/255 |
| 8,414,238 B2 * | 4/2013 | Inagaki | F16B 37/062 411/107 |
| 9,669,942 B2 * | 6/2017 | Khosravani | B64D 45/02 |
| 10,577,825 B1 * | 3/2020 | Givens | E04H 17/1456 |
| 2007/0036629 A1 * | 2/2007 | Hsu | F16B 37/085 411/45 |
| 2009/0129885 A1 * | 5/2009 | Csik | F16B 37/046 248/220.21 |

* cited by examiner

*Primary Examiner* — Gary W Estremsky
(74) *Attorney, Agent, or Firm* — My Patent Guys; Christopher Pilling

(57) ABSTRACT

An alignment cam pin system is provided. The system includes an alignment pin having a distal end and a proximal end. The alignment pin has a first flange at the proximal end, a cylindrical press fit surface abutting the first flange, and a threaded extension extending from the cylindrical press fit surface. An alignment pin sleeve is provided, which includes a sleeve body and a second flange, wherein the sleeve body includes internal threads configured to mate with the threaded extension. The cylindrical press fit surface of the alignment pin is configured to be press fit into an alignment hole of a vehicle's suspension component, such as a control arm, and the sleeve body of the alignment pin sleeve is configured to be threaded on the threaded extension of the alignment pin such that the alignment pin does not fall out of the alignment hole during vehicle use.

5 Claims, 4 Drawing Sheets

ALIGNMENT CAM PIN SYSTEM

CROSS-REFERENCE TO RELATED APPLICATIONS

N/A

BACKGROUND OF THE INVENTION

1. Field of the Invention

The present invention relates to vehicle alignment tools but more particularly to an alignment cam pin system.

2. Description of Related Art

A misaligned vehicle can cause a number of problems including uneven tire wear, off center steering, and other potential issues. During an alignment procedure, the vehicle's suspension is aligned, which adjusts the angles of the tires and how the tires make contact with the road. Alignment pins, guide pins, cam (camber) pins are tools to make the alignment procedure easier. However, the original equipment manufacturer (OEM) alignment pins often fall out of the vehicle due to vibrations, or become damaged. After market alignment pins have been developed to attempt to solve this problem. Yet, these seem to only offer a slight increase in longevity and suffer the same issues. Consequently, a solution is needed.

BRIEF SUMMARY OF THE INVENTION

The following presents a simplified summary of some embodiments of the invention in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented later.

In one aspect of the invention an alignment cam pin system is provided, comprising an alignment pin having a distal end and a proximal end, the alignment pin having a first flange at the proximal end, a cylindrical press fit surface abutting the first flange, and a threaded extension extending from the cylindrical press fit surface; an alignment pin sleeve comprising a sleeve body and a second flange, wherein the sleeve body includes internal threads configured to mate with the threaded extension; wherein the cylindrical press fit surface of the alignment pin is configured to be press fit into an alignment hole of a vehicle's suspension component such that the first flange abuts one side of the vehicle's suspension component; and, wherein the sleeve body of the alignment pin sleeve is configured to be threaded on the threaded extension of the alignment pin until the second flange abuts the other side of the vehicle's suspension component such that the alignment pin does not fall out of the alignment hole during use.

In another aspect of the invention, an alignment cam pin system is provided, comprising an alignment pin having a threaded extension having male threads; an alignment pin sleeve having female threads, wherein the alignment pin sleeve is configured to be threaded on the threaded extension; and, wherein the alignment cam pin system is configured to be used as a wheel alignment aid for a vehicle via the vehicle's suspension.

In one embodiment, the alignment pin includes a first flange and a cylindrical press fit surface, wherein the cylindrical press fit surface is positioned between the flange and the threaded extension. In another embodiment, the cylindrical press fit surface is larger in diameter than the threaded extension. In yet another embodiment, the cylindrical press fit surface includes a knurled surface finished. In one embodiment, the alignment pin sleeve comprises a second flange and a sleeve body. In another embodiment, the first flange and the second flange are configured to touch opposite sides of a portion of the vehicle's suspension. In yet another embodiment, the sleeve body includes a pair of wrench flats at the distal end of the alignment pin sleeve.

The foregoing has outlined rather broadly the more pertinent and important features of the present disclosure so that the detailed description of the invention that follows may be better understood and so that the present contribution to the art can be more fully appreciated. Additional features of the invention will be described hereinafter which form the subject of the claims of the invention. It should be appreciated by those skilled in the art that the conception and the disclosed specific methods and structures may be readily utilized as a basis for modifying or designing other structures for carrying out the same purposes of the present disclosure. It should be realized by those skilled in the art that such equivalent structures do not depart from the spirit and scope of the invention as set forth in the appended claims.

BRIEF DESCRIPTION OF THE SEVERAL VIEWS OF THE DRAWINGS

Other features and advantages of the present invention will become apparent when the following detailed description is read in conjunction with the accompanying drawings, in which.

DETAILED DESCRIPTION OF THE PREFERRED EMBODIMENT

The following description is provided to enable any person skilled in the art to make and use the invention and sets forth the best modes contemplated by the inventor of carrying out his invention. Various modifications, however, will remain readily apparent to those skilled in the art, since the general principles of the present invention have been defined herein to specifically provide an alignment cam pin system.

It is to be understood that the terminology used herein is for the purpose of describing particular embodiments only and is not intended to be limiting. The terms "a" or "an," as used herein, are defined as to mean "at least one." The term "plurality," as used herein, is defined as two or more. The term "another," as used herein, is defined as at least a second or more. The terms "including" and/or "having," as used herein, are defined as comprising (i.e., open language). The term "coupled," as used herein, is defined as connected, although not necessarily directly, not necessarily mechanically, and not permanent. The term "providing" is defined herein in its broadest sense, e.g., bringing/coming into physical existence, making available, and/or supplying to someone or something, in whole or in multiple parts at once or over a period of time. As used herein, the terms "about," "generally," or "approximately" apply to all numeric values, whether or not explicitly indicated. These terms generally refer to a range of numbers that one of skill in the art would consider near the stated amount by about 0%, 5%, or 10%, including increments therein. In many instances these terms may include numbers that are rounded to the nearest significant figure.

Figure 1:
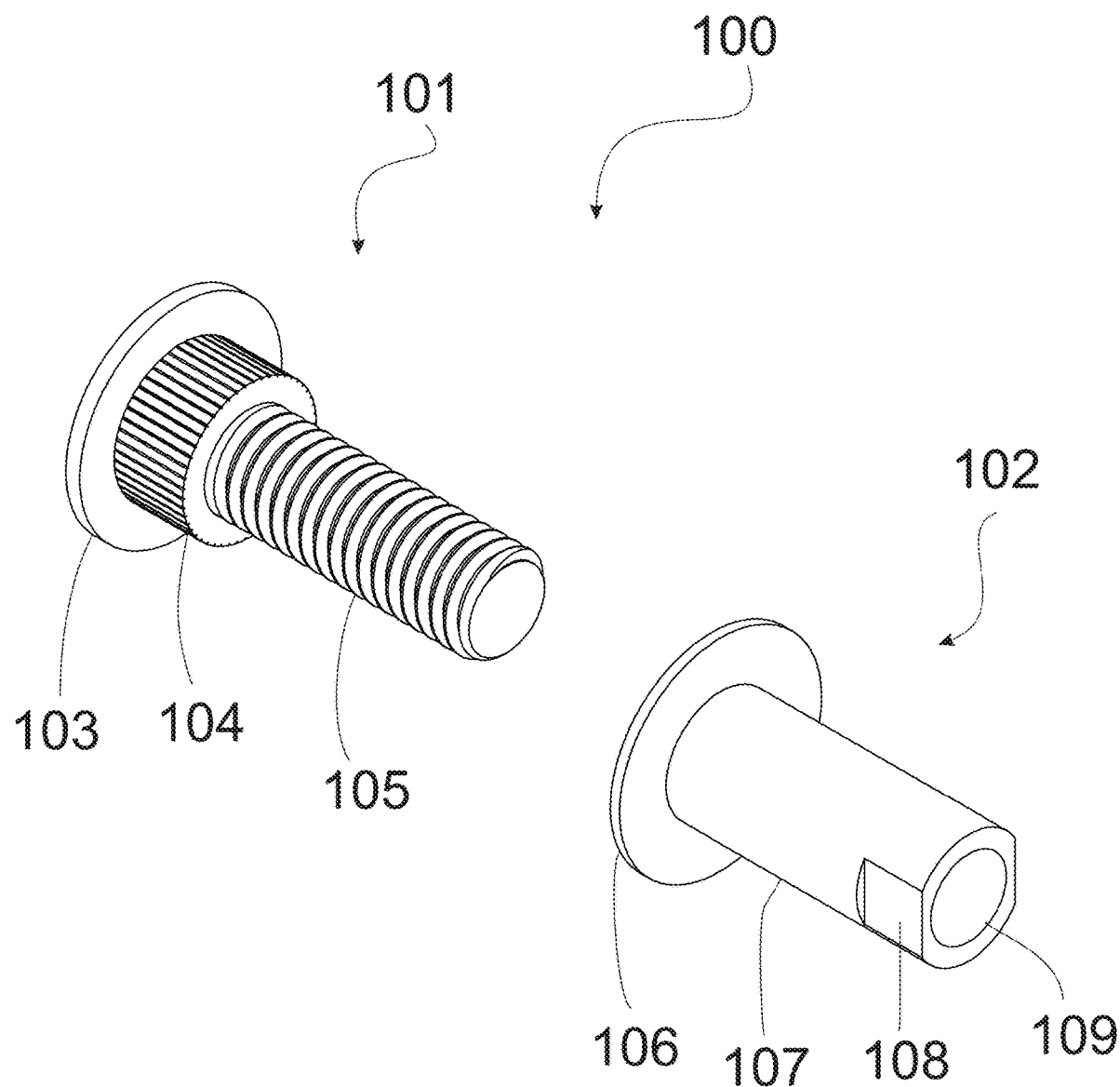
FIG. 1 is a perspective view of an alignment cam pin system according to an embodiment of the present invention.
Figure 2:
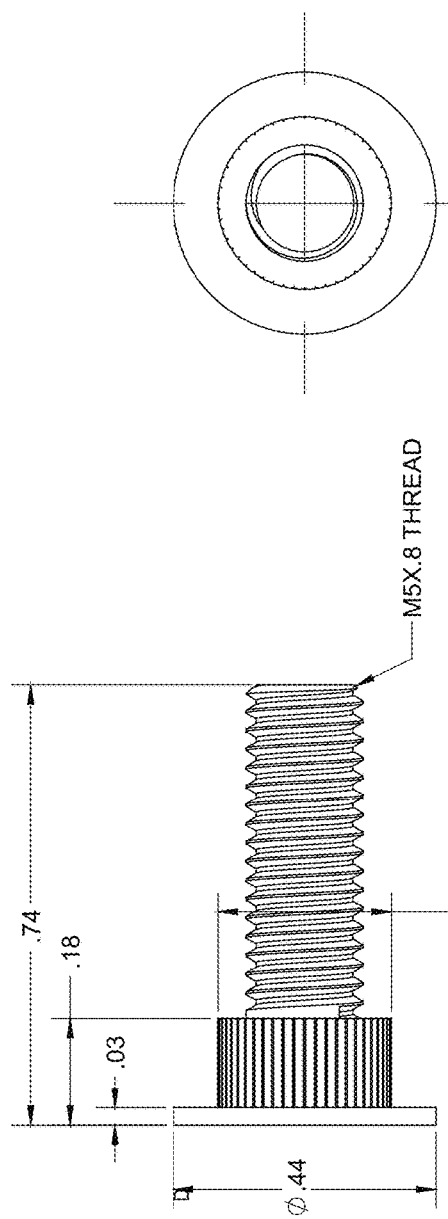
FIG. 2 is a dimensioned side and front view of the alignment pin according to an embodiment of the present invention.
Figure 3:
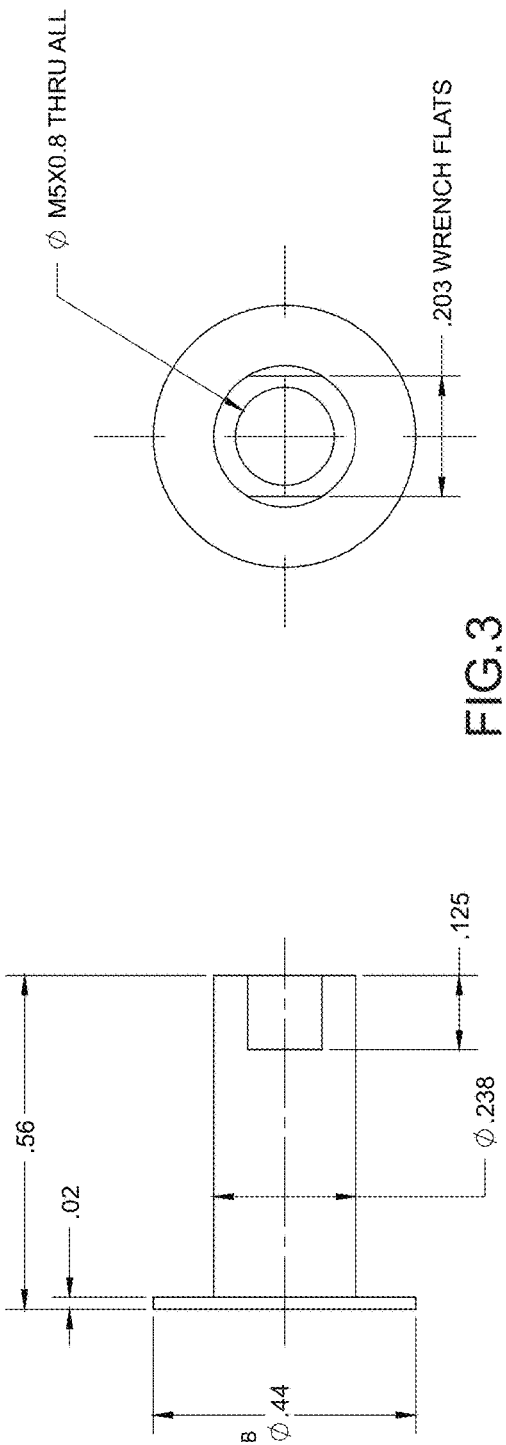
FIG. 3 is a dimensioned side and front view of the alignment pin sleeve according to an embodiment of the present invention.

Referring now to FIGS. 1-3, an alignment cam pin system 100 is illustrated. In one embodiment, the alignment cam pin system 100 includes an alignment pin 101 and an alignment pin sleeve 102. In one embodiment, the alignment pin 101 comprises flange 103, a cylindrical press fit surface 104, and a threaded extension 105. In one embodiment, the flange 103 has a smooth finish, and is approximately 0.4 inches in diameter with a thickness of is this It should be understood that any dimensions discussed herein may vary without departing from the spirit and scope of the invention. Different vehicles will require different size cam pin systems and the dimensions can be altered to fit other vehicles. The instant example provided herein was desired for several American made trucks, for example General Motors®, however the dimensions may be modified for use in other vehicles.

Figure 4:
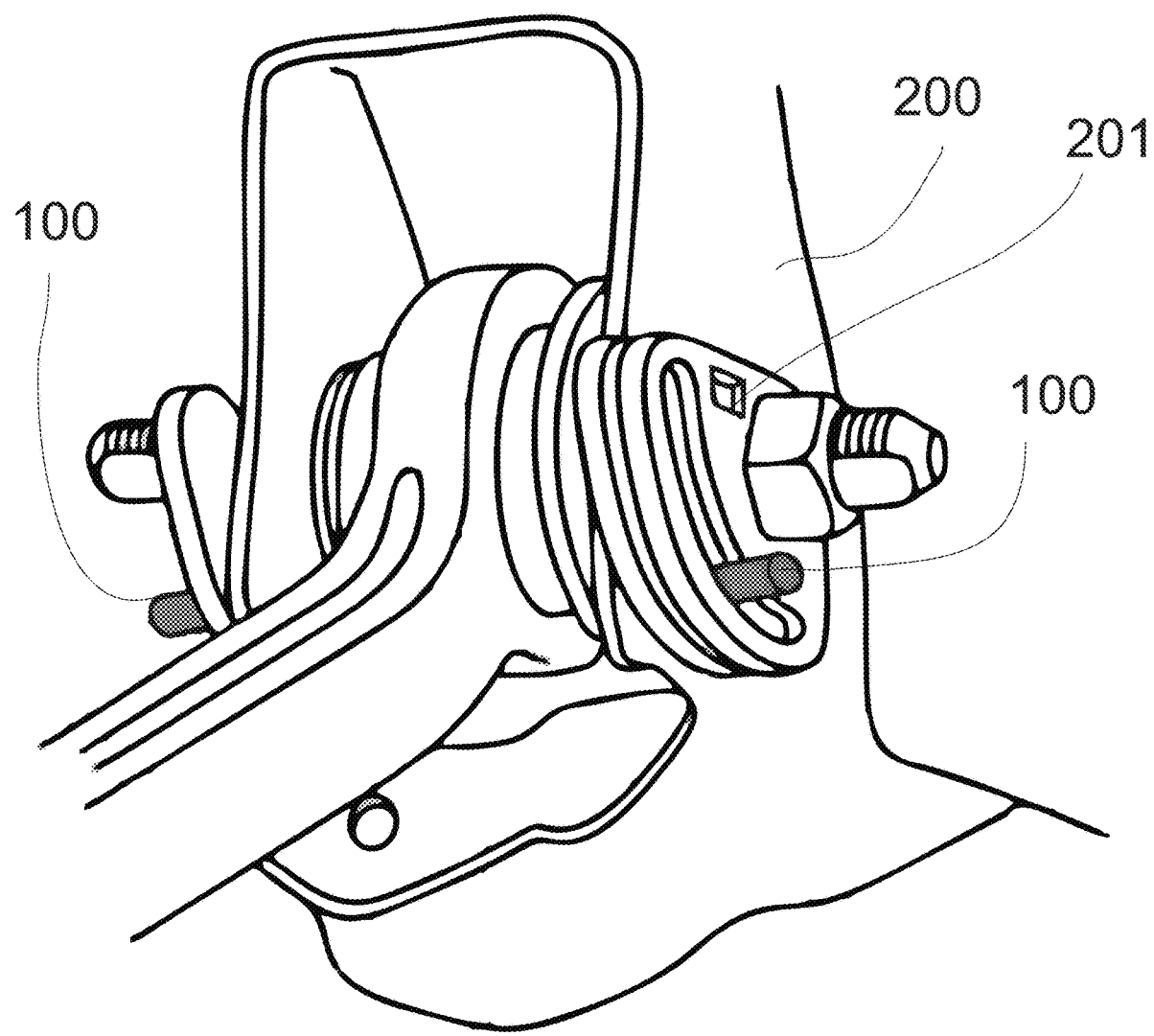
FIG. 4 is a perspective exemplary example of the alignment cam pin system in use according to an embodiment of the present invention.
Figure 5A:
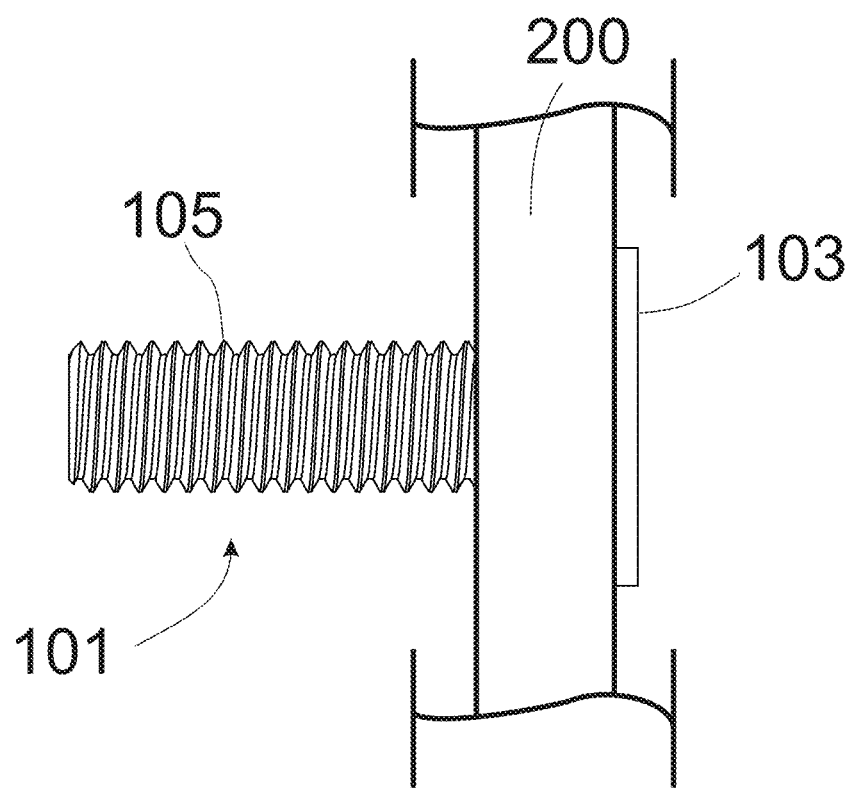
FIGS. 5A-B are detailed views of the alignment cam pin system in use according to an embodiment of the present invention.

In some embodiments, the cylindrical press fit surface 104, includes a straight knurled surface finished. This surface is configured to be pressed fit within the alignment openings of the suspension components (as illustrated in the example of FIG. 4 and accompanying detailed drawings, FIGS. 5A-B). The knurled finished helps grip the surfaces as well known in the art. The diameter 0.29 inches and length 0.15 inches is for specific to at least one manufacturer of trucks, however the dimensions may vary. Finally, the threaded extension 105 extends from the cylindrical press fit surface 104. In one embodiment, the threaded extension includes M5×0.8 thread however, it is only critical that this external threading match the inner thread of the alignment pin sleeve 102 which will be discussed in further details below. The length of the threaded extension may vary, but it should be of sufficient length to extend through the openings of the suspension components to (a) provide an alignment guide, and (b) allow for the alignment pin sleeve 102 to be installed. In one embodiment, the threaded extension 105 is 0.56 inches in length.

In one embodiment, the alignment pin sleeve 102 comprises flange 106, sleeve body 107, a pair of wrench flats 108, and through-hole 109. Advantageously, the alignment pin sleeve 102, and more specifically, the sleeve body 107 is configured to be threaded onto the threaded extension 105 of the alignment pin 101. As previously mentioned, the interior (female) threads are configured to match the exterior (male) threads of the threaded extension 105. In some embodiments, the entire inner surface of the sleeve body 107 is threaded. Further, the through hole 109 allows for a portion of the threaded extension 105 to protrude though the through-hole 109.

Figure 5B:
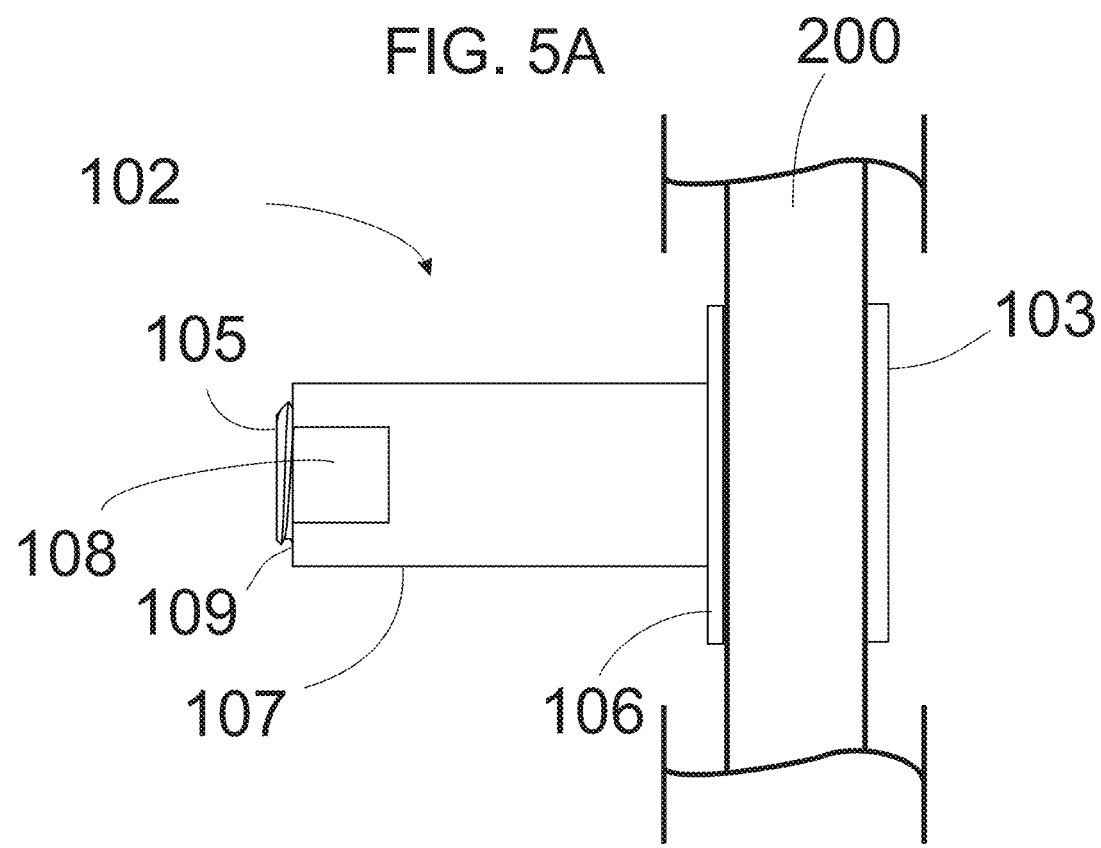

Best seen in FIGS. 4-5B, during use, the alignment pin 101 of the alignment cam pin system 100 is inserted (press fit) into a through-hole provided in the control arm 200 of a vehicle's suspension. It should be stated, that the previous installed alignment pin (if applicable) needs to be removed prior to the steps described herein. When installed, the flange 103 should be rested against the material of the control arm 200. Next, the alignment pin sleeve 102 is threaded onto the threaded extension 105 until the flange 106 presses against the other side of the control arm 200. The wrench flats may be used to tighten the alignment pin sleeve 102 in position. The alignment cam pin system 100 is now ready for use as well known in the art. Advantageously, the alignment pin sleeve 102 prevents the alignment pin 101 from falling out of position during vehicle use. The alignment pin sleeve also protects the alignment cam pin system from damage.

Although the invention has been described in considerable detail in language specific to structural features, it is to be understood that the invention defined in the appended claims is not necessarily limited to the specific features described. Rather, the specific features are disclosed as exemplary preferred forms of implementing the claimed invention. Stated otherwise, it is to be understood that the phraseology and terminology employed herein, as well as the abstract, are for the purpose of description and should not be regarded as limiting. Therefore, while exemplary illustrative embodiments of the invention have been described, numerous variations and alternative embodiments will occur to those skilled in the art. Such variations and alternate embodiments are contemplated, and can be made without departing from the spirit and scope of the invention.

It should further be noted that throughout the entire disclosure, the labels such as left, right, front, back, top, bottom, forward, reverse, clockwise, counter clockwise, up, down, or other similar terms such as upper, lower, aft, fore, vertical, horizontal, oblique, proximal, distal, parallel, perpendicular, transverse, longitudinal, etc. have been used for convenience purposes only and are not intended to imply any particular fixed direction or orientation. Instead, they are used to reflect relative locations and/or directions/orientations between various portions of an object.

In addition, reference to "first," "second," "third," and etc. members throughout the disclosure (and in particular, claims) are not used to show a serial or numerical limitation but instead are used to distinguish or identify the various members of the group.

What is claimed is:

1. A system comprising:
    a vehicle suspension component having an alignment hole extending between a first side and a second side;
    an alignment pin having a first flange, a cylindrical press fit surface abutting the first flange, and a threaded extension extending from the cylindrical press fit surface, the cylindrical press fit surface being configured to be press fit into the alignment hole of the vehicle suspension component;
    an alignment pin sleeve comprising a sleeve body with internal threads configured to mate with the threaded extension, a second flange at one end of the sleeve body, wherein, when the alignment pin is press fit into the alignment hole of the vehicle suspension component such that the first flange abuts the first side of the vehicle suspension component, the sleeve body of the alignment pin sleeve is threaded onto the threaded extension until the second flange abuts the second side of the vehicle suspension component, thereby preventing the alignment pin from falling out of the alignment hole during use.

2. The system of claim 1, wherein the cylindrical press fit surface is larger in diameter than the threaded extension.

3. The of claim 1, wherein the cylindrical press fit surface includes a knurled surface finished.

4. The system of claim 1, wherein the sleeve body includes a pair of wrench flats at a distal end the alignment pin sleeve.

5. A system comprising:
- a vehicle suspension component having an alignment hole extending between a first side and an opposing second side;
- an alignment pin comprising a distal end and a proximal end, the alignment pin having a first flange at the proximal end, a cylindrical press fit surface abutting the first flange, and a threaded extension extending from the cylindrical press fit surface;
- an alignment pin sleeve comprising a sleeve body and a second flange, wherein the sleeve body includes internal threads configured to mate with the threaded extension;
- wherein the cylindrical press fit surface of the alignment pin is press fit into the alignment hole of the vehicle suspension component such that the first flange abuts the first side of the vehicle suspension component; and,
- wherein the sleeve body of the alignment pin sleeve is threaded on the threaded extension of the alignment pin until the second flange abuts the second side of the vehicle suspension component thereby securing the alignment pin within the alignment hole and preventing the alignment pin from falling out of the alignment hole during use.

* * * * *